United States Patent
Sayed

(10) Patent No.: US 10,875,428 B2
(45) Date of Patent: Dec. 29, 2020

(54) SEAT BACK WITH RADIANT HEATING

(71) Applicant: GM Global Technology Operations LLC, Detroit, MI (US)

(72) Inventor: Rami Z. Sayed, Farmington Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/400,694

(22) Filed: May 1, 2019

(65) Prior Publication Data

US 2020/0346567 A1    Nov. 5, 2020

(51) Int. Cl.
   *B60N 2/56*    (2006.01)
   *B60N 2/879*   (2018.01)
   *B60N 2/70*    (2006.01)

(52) U.S. Cl.
   CPC .......... *B60N 2/56* (2013.01); *B60N 2/879* (2018.02); *B60N 2/7017* (2013.01)

(58) Field of Classification Search
   CPC ......... B60N 2/56; B60N 2/879; B60N 2/7017
   USPC ............................................. 297/180.1
   See application file for complete search history.

(56) References Cited

U.S. PATENT DOCUMENTS

| | | | | |
|---|---|---|---|---|
| 2,961,522 A * | 11/1960 | Hammer | ........... | F24D 13/02 219/541 |
| 9,845,031 B2 * | 12/2017 | Oh | ........... | B60H 1/0055 |
| 2009/0289045 A1 * | 11/2009 | Hotary | ........... | B60H 1/2225 219/202 |
| 2012/0031452 A1 * | 2/2012 | Sjolund | ........... | B60N 2/5678 136/222 |
| 2013/0068440 A1 * | 3/2013 | Kamiyama | ........... | B60H 1/00878 165/202 |
| 2015/0224850 A1 * | 8/2015 | Bank | ........... | B60H 1/00314 392/340 |
| 2018/0257456 A1 * | 9/2018 | Oh | ........... | B60H 1/2215 |
| 2019/0047367 A1 * | 2/2019 | Elson | ........... | B60H 1/2218 |
| 2019/0335907 A1 * | 11/2019 | Tanaka | ........... | F24H 9/06 |

* cited by examiner

*Primary Examiner* — Mark R Wendell

(57) ABSTRACT

A seat located in a cabin of a motor vehicle includes a seat back and a layer of radiant material embedded in the seat back. The radiant material directs heat to one or more occupants residing in a rear region of the cabin in the motor vehicle.

7 Claims, 3 Drawing Sheets

SEAT BACK WITH RADIANT HEATING

INTRODUCTION

The present disclosure relates to seat for a motor vehicle. More specifically, the present disclosure relates to seat with radiant heating.

Most motor vehicles include a heating system to provide comfort and warmth to the occupants of the vehicle. Typically, warm air is directed through ducts at the front occupants. In some vehicles, additional ducting directs warm air to occupants situated behind the front seats. This additional ducting, however, requires that the front seats be raised to provide room for the ducting, which may require the raising of the vehicle roof.

Thus, while current motor vehicle heating systems achieve their intended purpose, there is a need for a new and improved system to provide heat to the occupants situated behind the front seats.

SUMMARY

According to several aspects, a seat located in a cabin of a motor vehicle includes a seat back and a layer of radiant material embedded in the seat back. The radiant material directs heat to one or more occupants residing in a rear region of the cabin in the motor vehicle.

In an additional aspect of the present disclosure, the seat further includes a head rest with a layer of radiant material embedded in the head rest, the radiant material in the head rest directing heat to the one or more occupants residing in the rear region of the cabin in the motor vehicle.

In another aspect of the present disclosure, the seat further includes a bottom portion with a layer of radiant material embedded in the bottom portion, the radiant material in the bottom portion directing heat to the one or more occupants residing in the rear region of the cabin in the motor vehicle.

In another aspect of the present disclosure, the seat further includes an insulating layer embedded in the seat back and positioned between the layer of radiant material and a front region of the seat back such that radiant heat from the layer of insulating material is not directed at an occupant of the seat.

In another aspect of the present disclosure, the insulating layer is a layer of foam.

In another aspect of the present disclosure, the layer of radiant material is a woven sheet.

In another aspect of the present disclosure, the layer of radiant material is made of a positive thermal coefficient material and Mylar.

In another aspect of the present disclosure, the layer of radiant material is connected to an energy source.

In another aspect of the present disclosure, the energy source is connected to a controller that enables an occupant of the motor vehicle to adjust the level of radiant heat directed to the one or more one or more occupants residing in the rear region of the cabin in the motor vehicle.

According to several aspects, a seat located in a cabin of a motor vehicle includes a seat back, a head rest, and a bottom portion. Each of the seat back, the head rest and the bottom portion includes an embedded layer of radiant material. Each layer of radiant material directs heat to one or more occupants residing in a rear region of the cabin in the motor vehicle.

In another aspect of the present disclosure, the seat further includes a first insulating layer embedded in the seat back and positioned between the layer of radiant material and a front region of the seat back, a second insulating layer embedded in the head rest and positioned between the layer of radiant material and a front region of the head rest, and a third insulating layer embedded in the bottom portion and positioned between the layer of radiant material and a front region of the bottom portion such that radiant heat from the layers of insulating material is not directed at an occupant of the seat.

In another aspect of the present disclosure, the first insulating layer is a molded layer of foam.

In another aspect of the present disclosure, the second insulating layer is made of foam poured in place in the head rest.

In another aspect of the present disclosure, the third insulating layer is a molded layer of foam.

In another aspect of the present disclosure, the layer of radiant material is a woven sheet.

In another aspect of the present disclosure, layer of radiant material is made of a positive thermal coefficient material and Mylar.

In another aspect of the present disclosure, the layer of radiant material is connected to an energy source.

In another aspect of the present disclosure, the energy source is connected to a controller that enables an occupant of the motor vehicle to adjust the level of radiant heat directed to the one or more one or more occupants residing in the rear region of the cabin in the motor vehicle.

According to several aspects, a motor vehicle with a seat includes a cabin with a front region and a rear region, and a seat located in the front region of the cabin. The seat includes a seat back, a head rest and a bottom portion, each of the seat back, the head rest and the bottom portion including an embedded layer of radiant material, each layer of radiant material directing heat to one or more occupants residing in a rear region of the cabin in the motor vehicle.

In another aspect of the present disclosure, the seat includes a first insulating layer embedded in the seat back and positioned between the layer of radiant material and a front region of the seat back, a second insulating layer embedded in the head rest and positioned between the layer of radiant material and a front region of the head rest, and a third insulating layer embedded in the bottom portion and positioned between the layer of radiant material and a front region of the bottom portion such that radiant heat from the layers of insulating material is not directed at an occupant of the seat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
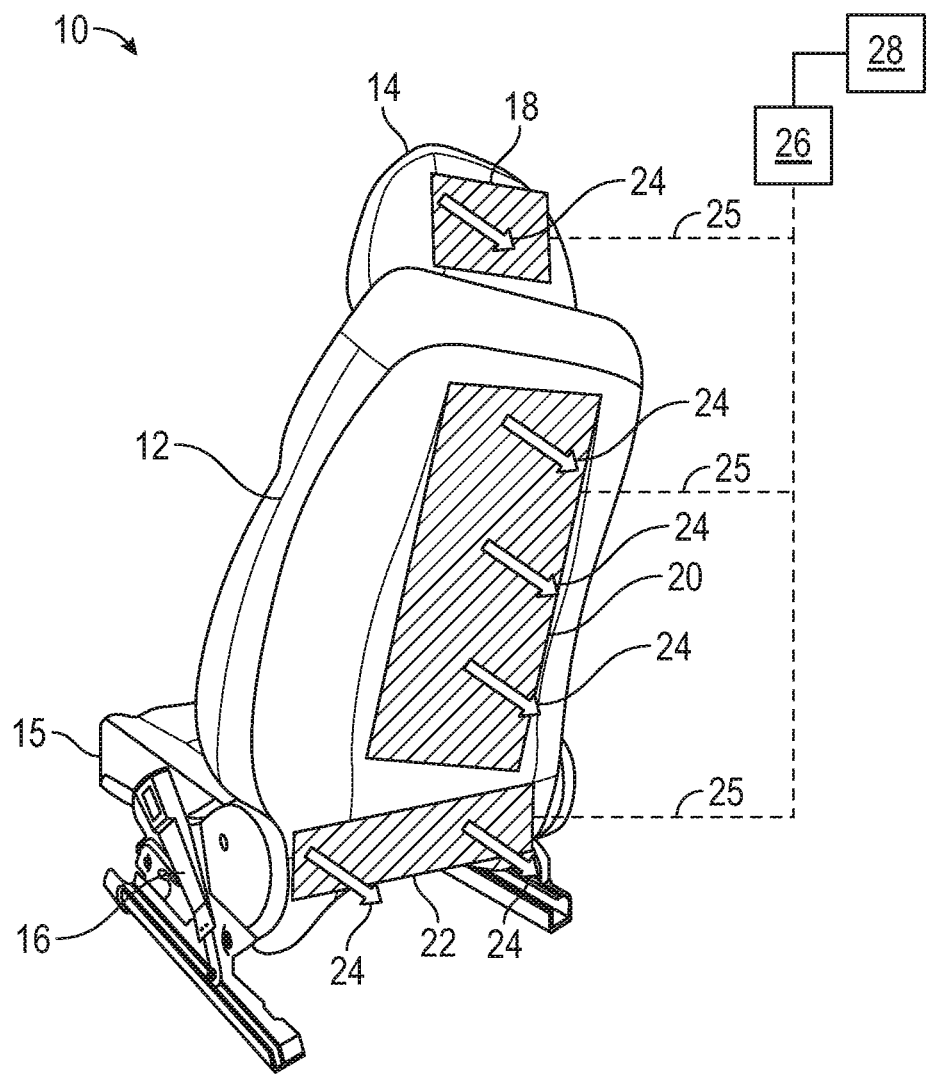
FIG. 1 is perspective view of a seat of a motor vehicle according to an exemplary embodiment.

Referring to FIG. 1, there is shown a seat 10 for a motor vehicle exhibiting features in accordance with the principles of the present disclosure. The seat 10 includes a seat back 12 connected to a bottom portion 15. In most arrangements, the seat back 12 is able to pivot relative to the bottom portion 15 to recline the seat back 12 to satisfy the comfort requirements of the occupant of the seat 10. The seat 10 further includes a head rest 14 attached to the seat back 12. The head rest 14 is able to move upwards and downwards relative to the seat back 12 to proper support to the head of the occupant of the seat 10. The bottom portion 15 is connected to a base 16 that is attached to the floor of the motor vehicle to secure the seat 10 to the motor vehicle.

The seat 10 is generally located in a front or forward region of a cabin of the motor vehicle. More specifically, the seat 10 is located in front of a rear region of the motor vehicle typically occupied by rear sitting passengers. Each of the seat back 12, the head rest 14 and the bottom portion 15 includes a region 20, 18 and 22, respectively, that radiates heat to the one or more occupants residing in the rear region of the cabin behind the seat 10, as indicated by the arrows 24.

Each of the seat back 12, the head rest 14 and the bottom portion 15 is connected, for example, by a line to an energy source 26. The energy 26 is in various arrangements a battery. The supply of energy from the battery 26 is determined by a setting of a controller 28. The controller 28 is located, in various arrangements, within reach of an occupant, such as a driver, in the front region of the cabin. In other arrangements, the controller is located within reach of the one or more rear occupants, while in particular arrangements, dual controllers in the front and rear enable either the front or the rear occupants to control the amount of radiant heat directed to the rear occupants. Further, each of the regions 20, 22 and 24 are independently controlled, in various arrangements, to independently control the amount of heat directed at the upper torso, mid torso and foot area of the one or more occupants situated in the rear of the cabin.

Figure 2A:
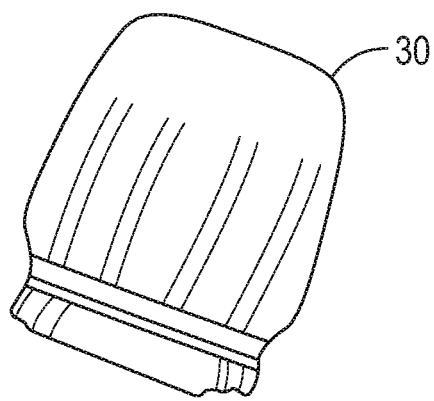
FIG. 2A is a perspective view of an insulating layer for the seat according to an exemplary embodiment.
Figure 2B:
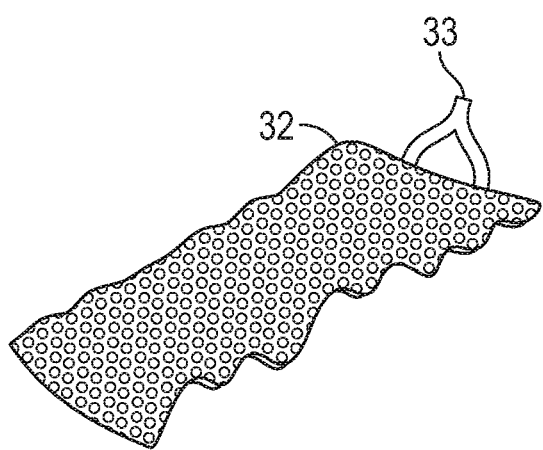
FIG. 2B is a perspective view of a layer of radiant material for the seat according to an exemplary embodiment.

Each of the seat back 12, the head rest 14 and the bottom portion 15 includes a layer of radiant material 32 (FIG. 2B) that provides the radiant heat. In many arrangements, the layer of radiant material 32 includes a pigtail lead 33 that is connected to the respective lines 25. The pigtail leads 33 are typically routed through the bottom of the respective component 12, 14 and 15 or at tooling holes located in the component. In some arrangements, the layer of radiant material 32 is made from a woven sheet, while in other arrangements the layer of radiant material 32 is made from a positive thermal coefficient (PTC) material and Mylar. The layer of radiant material 32 is generally flexible for forming into a desired shape and/or is stretchable to be molded.

Each of the seat back 12, the head rest 14 and the bottom portion 15 further includes an insulating layer positioned between the layer of radiant material 33 and a front region of the seat back 12, the head rest 14 and the bottom portion 15 so that heat from the layer of radiant material is directed rearwards only in the direction 24 and not towards the occupant of the seat 10. In some arrangements, the insulating material is a foam material. In particular arrangements, the foam material is poured, for example, into the head rest 14, while the foam is a molded back panel 30 (FIG. 2A) for the seat back 12 and a molded toe kick for the bottom portion 15.

Figure 3:
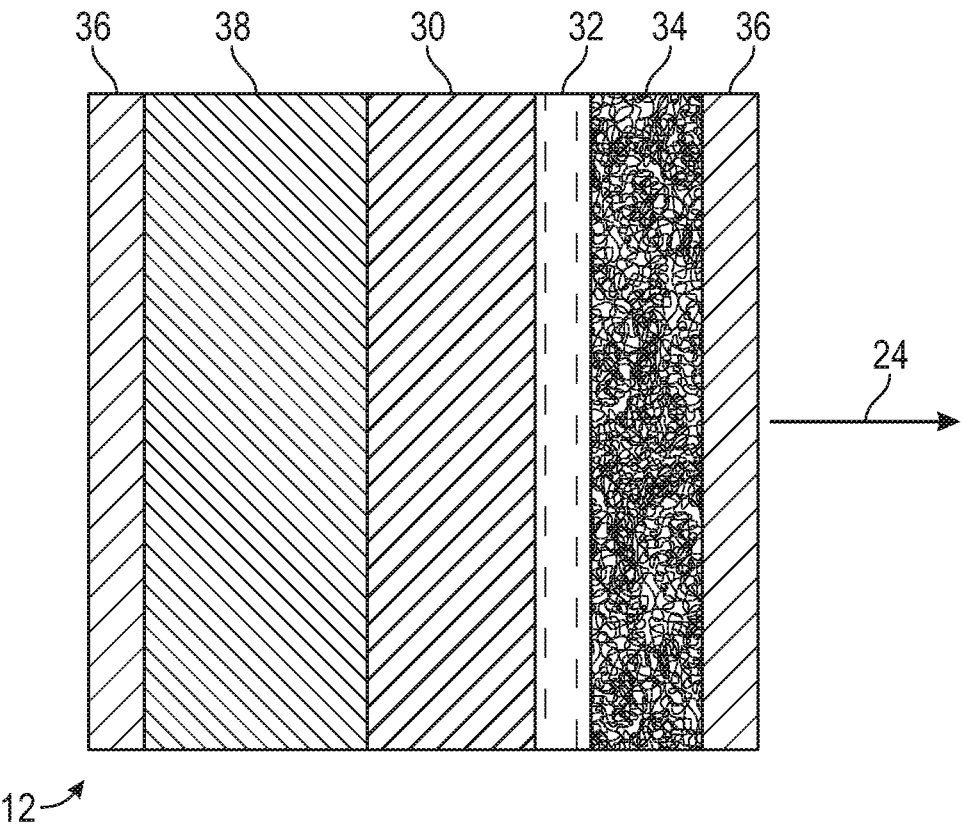
FIG. 3 is a cross-sectional view of a seat back for the seat according to an exemplary embodiment.

Referring further to FIG. 3, there is shown a cross-sectional view of the seat back 12 for particular arrangements. FIG. 3 shows the arrangement of the layer of radiant material 32 relative to the insulating layer 30 to ensure that heat from the layer of radiant material 32 is directed in the direction of the arrow 24 to the occupants situated behind the seat back 12 and not forward towards the occupant of the seat 10. The seat back 12, in particular arrangements, further includes trim fabric 34 to protect the layer of radiant material 32 and a layer of cushioning material 38 to provide support and comport to the occupant of the seat 10. In various arrangements, an outer layer of material 36, such as, for example, leather or cloth covers the seat back 12 for protection of the seat back 12 and for aesthetic purposes.

Figure 4:
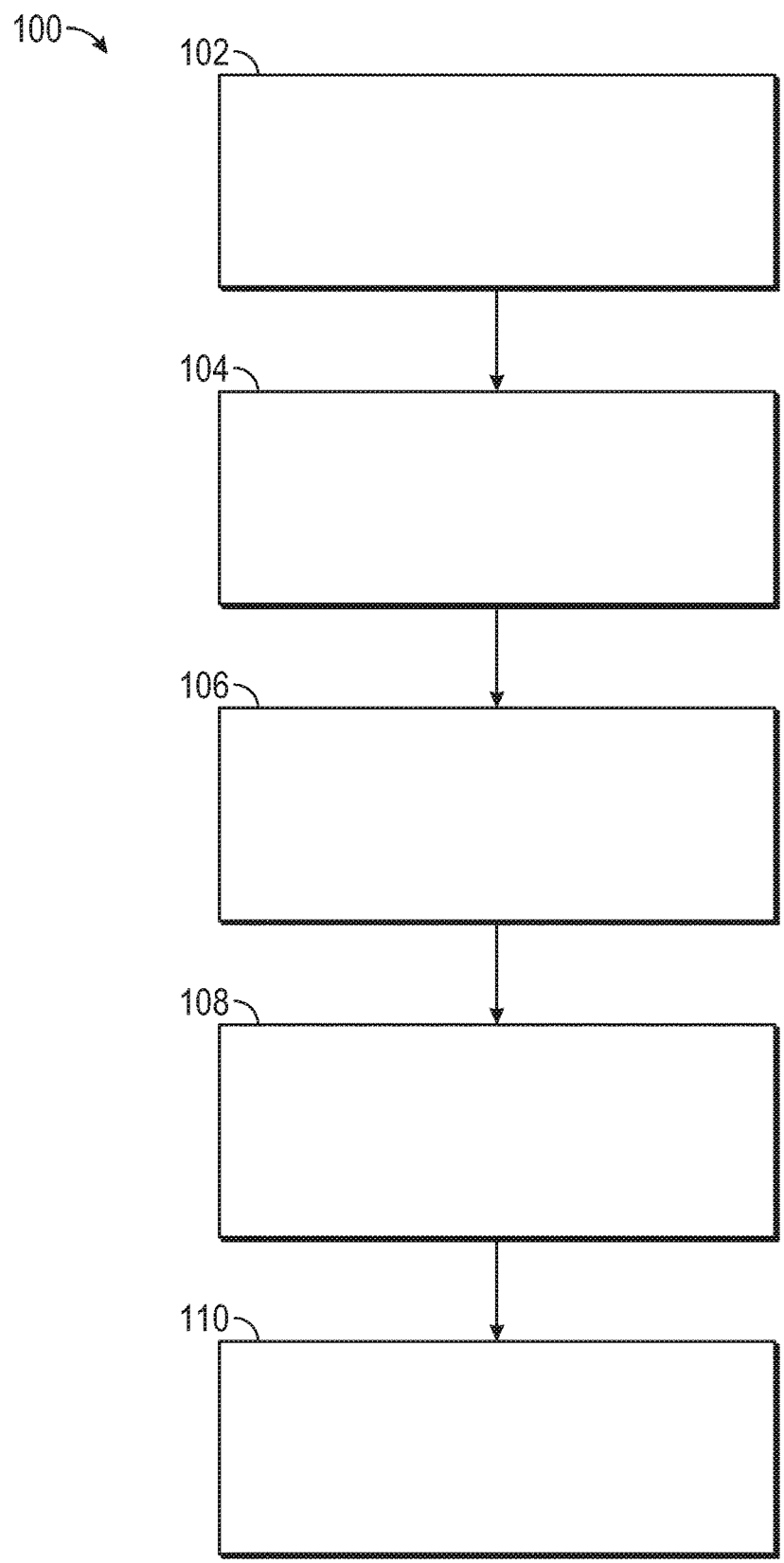
FIG. 4 is a flow diagram for a process to fabricate the seat according to an exemplary embodiment.

Referring now to FIG. 4, there is shown a flow diagram of a process 100 to fabricate, for example, the components of the seat 10. In step 102, the base trim is cut to size. The base trim is a thin fabric that is woven or knitted in some arrangements. The fabric is, in particular arrangements, patterned to mask the layer of radiant material 32. Next in step 104, the layer of radiant material 32 is inserted in strategic areas of the seat back 12, the head rest 14 and the bottom portion 15. The layer of radiant material 32 in some arrangements is aligned by tack sew to trim the fabric. The pigtails 33 are routed through the bottom of the component and/or at tooling holes in the component. In step 106, an insulating foam, such as, for example, polyurethane is introduced. The foam in step 108 is poured in place, for example, into the head rest 14 or placed in a pressing machine such that the foam is pressed into the desired shape for the seat back 12 or the bottom portion 15. The foam when cured has a desired hardness for comfort to the occupant of the seat and to comply with various regulations. Finally, in step 110, excess material is trimmed from the component. At this stage, in various arrangements, zippers are attached to the seat and pigtails, harness terminals and/or connects are attached to the seat 10.

A seat of the present disclosure offers several advantages. These include: increasing thermal comfort for rear seat occupants by providing selectable heat to the rear seat occupants upper torso, mid torso and foot area; optimizing under seat room of the front seats room by possibly removing ducting under the front seats; and reducing overall vehicle power consumption to heat the occupants of the vehicle.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seat located in a cabin of a motor vehicle, the seat comprising:
   a seat back;
   an insulating layer;
   a layer of radiant material embedded in the seat back, the layer of radiant material being made of a layer of a woven sheet positioned directly adjacent to the insulating layer;

a layer of trim material to protect the layer of radiant material, the layer of radiant material being positioned between the insulating layer and the layer of trim material; and an outer layer, the layer of trim material being positioned between the layer of radiant material and the outer layer, wherein the radiant material directs heat to one or more occupants residing in a rear region of the cabin in the motor vehicle.

2. The seat of claim 1 further comprising a head rest with a layer of radiant material embedded in the head rest, the radiant material in the head rest directing heat to the one or more occupants residing in the rear region of the cabin in the motor vehicle.

3. The seat of claim 1 wherein the insulating layer is embedded in the seat back and positioned between the layer of radiant material and a front region of the seat back such that radiant heat from the insulting layer is not directed at an occupant of the seat.

4. The seat of claim 3 wherein the insulating layer is a layer of foam.

5. The seat of claim 1 wherein the layer of radiant material is made of a positive thermal coefficient material and Mylar.

6. The seat of claim 1 wherein the layer of radiant material is connected to an energy source.

7. The seat of claim 6 wherein the energy source is connected to a controller that enables an occupant of the motor vehicle to adjust the level of radiant heat directed to the one or more occupants residing in the rear region of the cabin in the motor vehicle.

\* \* \* \* \*